(12) United States Patent
Glaser et al.

(10) Patent No.: US 6,188,208 B1
(45) Date of Patent: Feb. 13, 2001

(54) CYCLE-SKIPPING POWER CONTROL FOR AC LINE-POWERED LOADS

(75) Inventors: John Stanley Glaser, Niskayuna; Austars Raymond Schnore, Scotia; Ljubisa Dragoljub Stevanovic, Niskayuna, all of NY (US); Timothy Joseph Kottak, Louisville, KY (US)

(73) Assignee: General Electric Company, Schenectady, NY (US)

( * ) Notice: Under 35 U.S.C. 154(b), the term of this patent shall be extended for 0 days.

(21) Appl. No.: 09/366,304

(22) Filed: Aug. 2, 1999

(51) Int. Cl.[7] ................................................... G05F 1/10
(52) U.S. Cl. ............................................................ 323/235
(58) Field of Search .................................. 323/235, 236, 323/241

(56) References Cited

U.S. PATENT DOCUMENTS 4,064,414 * 12/1977 Bergeson et al. .................... 315/208
4,256,951   3/1981 Payne et al. .
4,897,527 * 1/1990 Cripps et al. ......................... 323/236
5,072,170 * 12/1991 Crane et al. .......................... 323/235

* cited by examiner

*Primary Examiner*—Adolf Deneke Berhane
*Assistant Examiner*—Gary L. Laxton
(74) *Attorney, Agent, or Firm*—Jill M. Breedlove; Douglas E. Stoner

(57) ABSTRACT

A cycle-skipping control system uses a pseudorandom number generator with a digital comparator to produce a random binary bit stream having a data rate equal to the frequency of the AC line. The bit stream is used to turn a power control switch coupled to the AC line source on and off such that the desired fraction of full load power is provided to the load. Fine power control resolution is achieved without requiring a long control period. In addition, perceptible flicker due to pulsating AC line current is reduced, both in visibly radiant loads and in electric illumination devices in close proximity to the load.

15 Claims, 2 Drawing Sheets

CYCLE-SKIPPING POWER CONTROL FOR AC LINE-POWERED LOADS

BACKGROUND OF THE INVENTION

The present invention relates to cycle-skipping control for AC line-powered loads, particularly for providing increased control resolution without requiring an increased control period.

Cycle-skipping control is also known as cycle-stealing control or integral cycle control. As generally used herein, these terms will also refer to ½ cycle control, since it will be understood by those of ordinary skill in the art that an integral cycle control can be modified to provide ½ cycle control.

Cycle-skipping control is often used to control high power electrical loads for which the response time constant is much longer than the period of the AC line used to power the load. An exemplary load is a kitchen range with electrical resistance burners wherein the thermal time constant may be on the order of one second or greater. Cycle-skipping control has the advantage that the power control switch is turned on and off when the load current and voltage are zero. As a result, electromagnetic interference generated by the switching action is essentially eliminated, and electrical stress on the switches is reduced, thereby increasing reliability.

Disadvantageously, however, cycle-skipping control produces pulsating currents in the electrical mains that supply the power to the system. Such current pulses result in voltage fluctuations due to the power source impedance, which may have detrimental effects on other loads connected to the same electrical mains. In particular, if the other loads are used for lighting purposes, for example, visible flicker may result. Such flicker may cause a variety of physical problems for humans, such as headaches and disorientation, or even epileptic seizures in susceptible individuals. Additionally, flicker may cause problems in the controlled load if the controlled load radiates visible light, e.g., as in a radiant electric burner.

Flicker problems in a visibly radiant load usually worsen as finer control resolution is required. Typical cycle-skipping control methods rely on skipping a certain percentage of cycles in a given control period. Hence, as power control resolution is increased, a greater number of cycles is needed in the control period. And as the control period approaches the visual time constant of the load, visible flicker ensues.

Phase control is an alternative type of control method that eliminates the flicker problem described hereinabove, but has the drawback that it inherently generates radio frequency interference and presents a reactive load to the AC line. Steps can be taken to alleviate these problems, but add expense, mass and bulk to the controller. A regulated switch-mode power supply could be used to control load power as well, but this is typically very expensive and thus not practicable.

Accordingly, it is desirable to provide a cycle-skipping controller that provides increased control resolution without the requirement of an increased control period. It is further desirable that such a cycle-skipping controller reduce perceptible flicker in both electrical lighting loads in proximity to the controlled load, as well as in the controlled load itself if the controlled load radiates visible light.

BRIEF SUMMARY OF THE INVENTION

In accordance with preferred embodiments of the present invention, a cycle-skipping control system comprises a random number generator as part of a power control waveform generator. In one embodiment, a pseudorandom number generator is used with a digital comparator to produce a random binary bit stream having a data rate equal to the frequency of the AC line (or two times the line frequency for the case of ½ cycle control). The probability of any particular bit having a true, or logic level one, state is equal to the desired fraction of the maximum load power. The bit stream is used to turn on and off a power control switch coupled to the AC line source such that the desired fraction of full load power is provided to the load.

Advantageously, such a cycle-skipping control scheme provides fine power control resolution without requiring a long control period. As another advantage, perceptible flicker due to pulsating AC line current is reduced, both in visibly radiant loads and in electric illumination devices in close proximity to the load.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
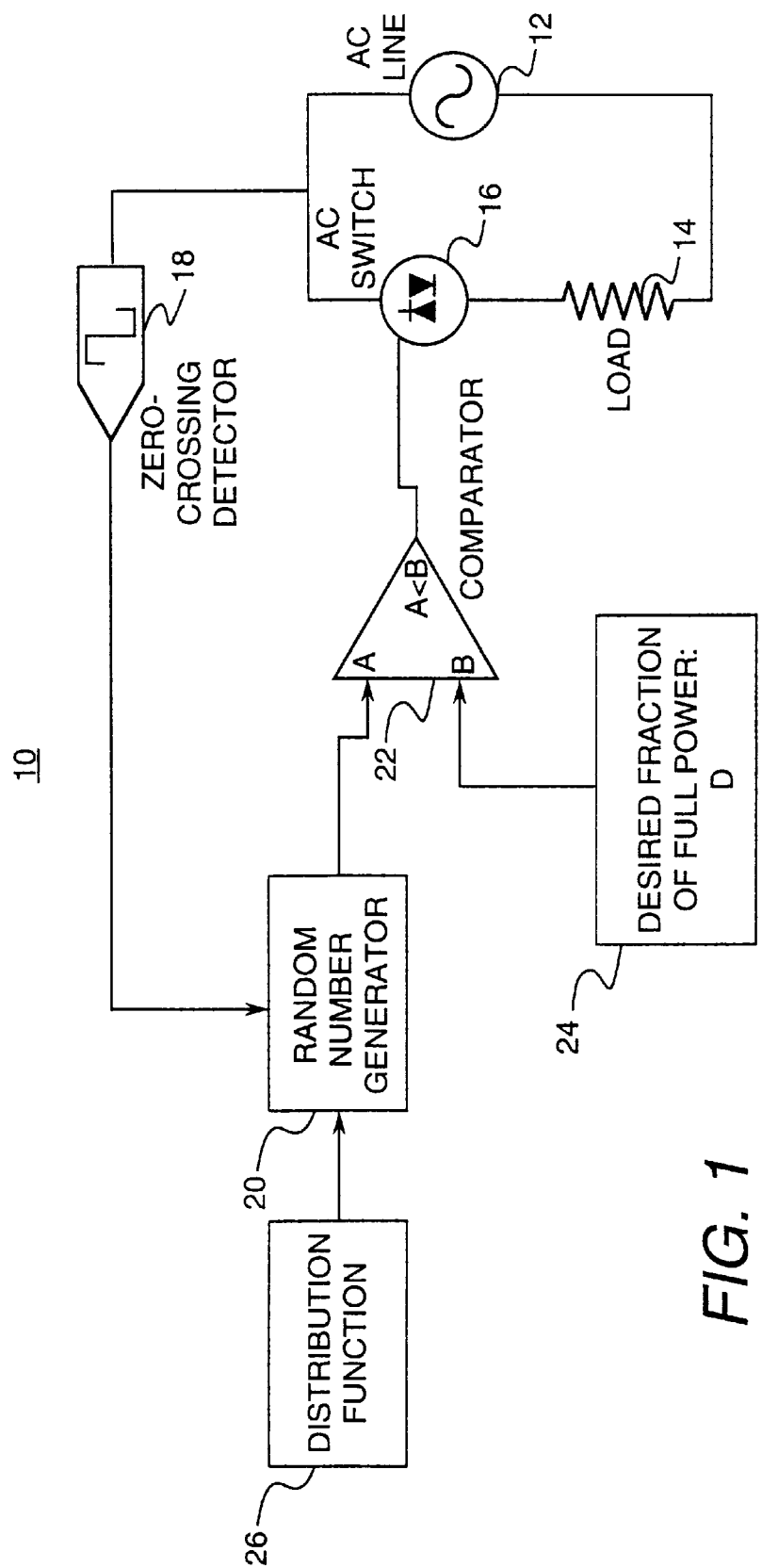
FIG. 1 illustrates an integral cycle control employing random number generation control in accordance with one embodiment of the present invention.

FIG. 1 illustrates a cycle-skipping control scheme according to one embodiment of the present invention wherein a random binary data stream is generated in order to add a random component to the cycle-skipping control and thereby increase resolution while reducing perceptible flicker.

In accordance with the description of the invention herein, a cycle of the AC line is defined as starting when the instantaneous AC line voltage is zero and is defined as finishing when the instantaneous line voltage next crosses zero with a slope of the same polarity as when the cycle started (or with opposite polarity for the case of ½ cycle control). An on-cycle is defined herein as a complete cycle of the AC line voltage during which the AC power switch that controls power to the load is on and power is delivered to the load.

The description herein is with particular reference to integral cycle control. As noted hereinabove, however, those of ordinary skill in the art will understand that an integral cycle control can be modified to provide ½ cycle control.

In the system 10 of FIG. 1, a random binary data stream is generated with the bit rate of the data stream being one bit per AC line cycle. The data stream is generated such that the probability of any bit being equal to one is equal to D, where D is the desired fraction of full load power.

FIG. 1 illustrates a source 12 of AC line voltage for supplying a load 14, the source 12 being coupled across the series combination of the load and an AC switch 16. A zero-crossing detector 18 is coupled to the AC line and provides a control signal to a random number generator 20. The output of the random number generator is provided as one input to a comparator 22, the other input being provided by a block 24 for generating the fraction D.

Operation of the system of FIG. 1 proceeds as follows:

At the beginning of each line cycle, when the instantaneous voltage is zero (as detected by zero-crossing detector 18), a random data stream having a distribution function determined by block 26 is generated by random number generator 20. In the exemplary embodiment of FIG. 1, random number generator 20 provides a uniformly distributed random data stream as determined by a uniform distribution function X=U(0,1) provided by distribution function block 26. The output of random number generator 20 is compared in comparator 22 to the desired fraction D that has been provided by block 24. If the random number is less than D, the output of comparator 22 is one; otherwise, it is zero. If the comparator output is one, AC switch 16 turns on at the beginning of the line cycle and stays on for one line cycle. In this way, the AC switch will be on during a fraction D of the time, order to provide the number of cycles needed to provide the desired power to the load.

For random number generators having other than a uniform distribution function, the fraction D should be modified by the alternative distribution function before it is provided as an input to the comparator in order to achieve the desired load power.

In alternative embodiments, the random number is not generated at the zero crossings, but rather at any time during the cycle; but the comparator output changes state only at the zero-crossings.

Figure 2:
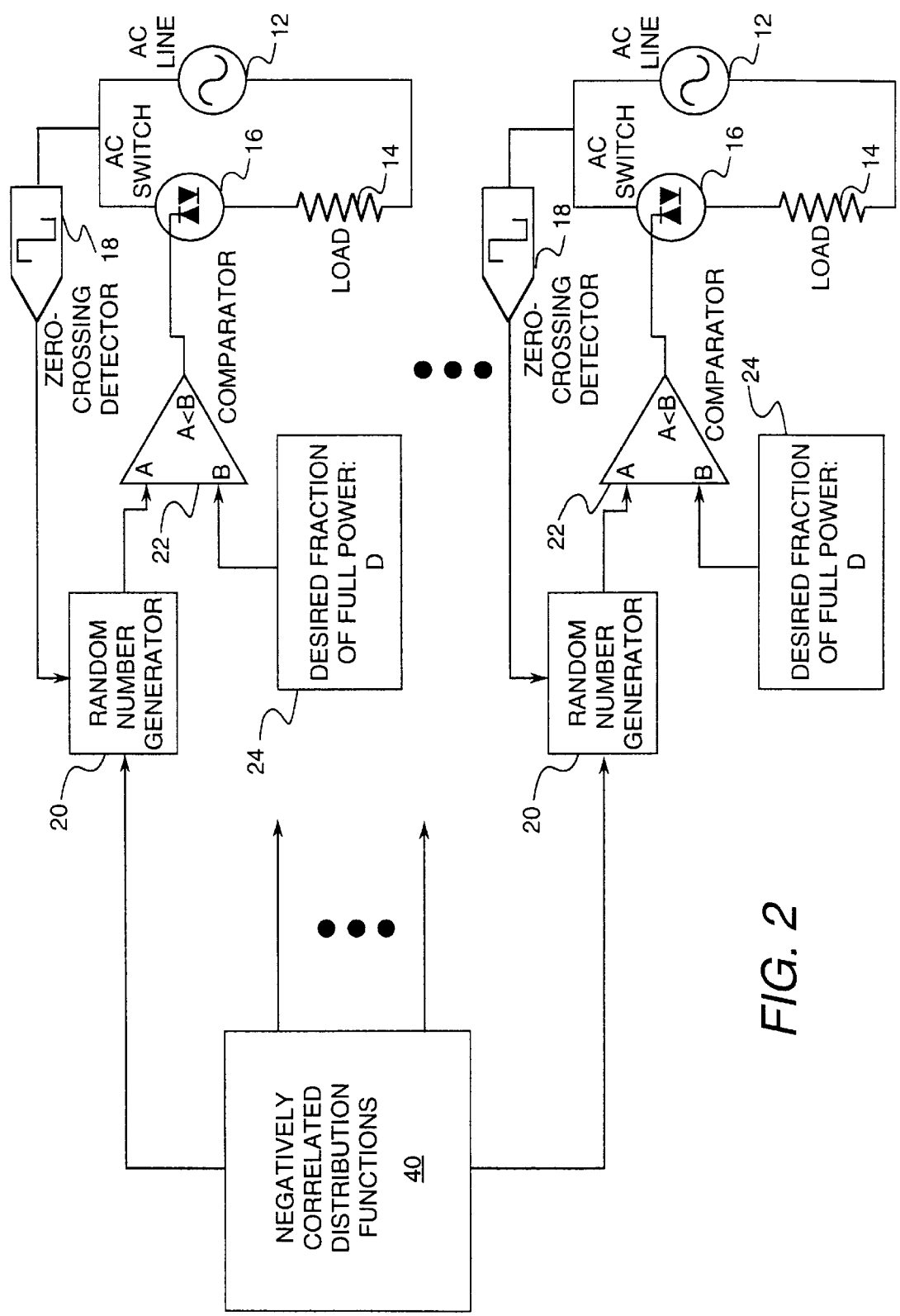
FIG. 2 illustrates an exemplary embodiment for supplying multiple loads using separate negatively correlated random number generators.

For cases of multiple loads, such as, for example, in the case of a cooktop with electric burners, it may be desirable to reduce the frequency with which multiple loads are switched simultaneously. In accordance with one embodiment of the present invention, this is accomplished by using separate negatively correlated random number generators for each load. By way of example, FIG. 2 illustrates negatively correlated distribution functions block 40 for providing such separate negatively correlated random number generators for multiple loads.

Advantageously, by adding randomness to cycle-skipping power control provides ideally infinite power control resolution without resorting to an infinite cycle-skipping control period. In practice, the resolution can be made arbitrarily high by increasing the number of bits used to perform computations and/or by increasing the sequence length of the pseudorandom number generator.

As another advantage, perceptible flicker is reduced, both in nearby electric lighting and, if applicable, in the load. The reduction in flicker perception is due to the spreading of any spectral lines of the power waveform due to the random modulation.

An integral control system of a type described herein is easily implemented with a microprocessor-based controller.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A cycle-skipping control system, comprising:

an AC switch for coupling to an AC line power source;

a zero-crossing detector for detecting when a cycle of the AC line power crosses zero voltage in order to detect the beginning of each AC line cycle;

a random number generator for generating a random number during each line cycle; and a comparator for comparing each random number generated by the random number generator to a predetermined fraction of full-load power, the comparator providing a logic level output if the random number is less than the predetermined fraction, the comparator providing an opposite logic level output if the random number is greater than the predetermined fraction, the output of the comparator being coupled to the AC switch such that the AC switch is turned on or off for the duration of each line cycle according to the state of the comparator output at the onset of the cycle, whereby when the system is operated for a duration significantly greater than the period of one AC cycle, the average number of cycles of AC line power being provided to a load corresponds to the predetermined fraction of full-load power.

2. The cycle-skipping control system of claim 1 wherein the random number generator has a uniform distribution function.

3. The cycle-skipping control system of claim 1 wherein the random number generator has a non-uniform distribution, the predetermined fraction being modified by the non-uniform distribution function prior to being inputted to the comparator.

4. The cycle-skipping control system of claim 1 wherein a random number is generated at each zero-crossing of the AC line cycle.

5. The cycle-skipping control system of claim 1 for supplying multiple loads, the loads having separate negatively correlated random number generators associated therewith.

6. A cycle-skipping control system for controlling AC line power to a load, comprising:

AC switch means for coupling an AC line power source and the load;

zero-crossing detection means for detecting when a cycle of the AC line power crosses zero voltage in order to detect the beginning of each AC line cycle;

random number generator means for generating a random number during each line cycle; and comparator means for comparing each random number generated by the random number generator to a predetermined fraction of full-load power, the comparator means providing a logic level output if the random number is less than the predetermined fraction, the comparator providing an opposite logic level output if the random number is greater than the predetermined fraction, the output of the comparator means being coupled to the AC switch means such that the AC switch means is turned on or off for the duration of each line cycle according to the state of the comparator means output at the onset of the cycle, whereby when the system is operated for a duration significantly greater than the period of one AC cycle, the average number of cycles of AC line power being provided to a load corresponds to the predetermined fraction of full-load power.

7. The cycle-skipping control system of claim 6 wherein the random number generator means has a uniform distribution function.

8. The cycle-skipping control system of claim 6 wherein the random number generator means has a non-uniform distribution, the predetermined fraction being modified by the non-uniform distribution function prior to being inputted to the comparator means.

9. The cycle-skipping control system of claim 6 wherein a random number is generated at each zero-crossing of the AC line cycle.

10. The cycle-skipping control system of claim 1 for supplying multiple loads, the loads having separate negatively correlated random number generators associated therewith.

11. A method for cycle-skipping control for controlling AC line power to a load, comprising:

coupling an AC line power source and the load using an AC switch;

detecting when a cycle of the AC line power crosses zero voltage in order to detect the beginning of each AC line cycle;

generating a random number during each line cycle; and comparing each random number generated to a predetermined fraction of full-load power;

providing a logic level output if the random number is less than the predetermined fraction, and providing an opposite logic level output if the random number is greater than the predetermined fraction, such that the AC switch is turned on or off for the duration of each line cycle according to the state of the comparator output at the onset of the cycle, whereby when the system is operated for a duration significantly greater than the period of one AC cycle, the average number of cycles of AC line power being provided to a load corresponds to the predetermined fraction of full-load power.

12. The method of claim 11 wherein the random number is generated according to a uniform distribution function.

13. The method of claim 11 wherein the random number is generated according to a non-uniform distribution, the predetermined fraction being modified by the non-uniform distribution function prior to the comparing step.

14. The method of claim 11 wherein a random number is generated at each zero-crossing of the AC line cycle.

15. The method of claim 11 for supplying multiple loads, the loads having separate negatively correlated random number generators associated therewith.

* * * * *